K. VON MADALER.
APPARATUS FOR PREPARING COMBINED CINEMATOGRAPHIC AND PHONOGRAPHIC RECORDS.
APPLICATION FILED OCT. 14, 1911.

1,204,091.

Patented Nov. 7, 1916.

Witnesses.

Inventor,

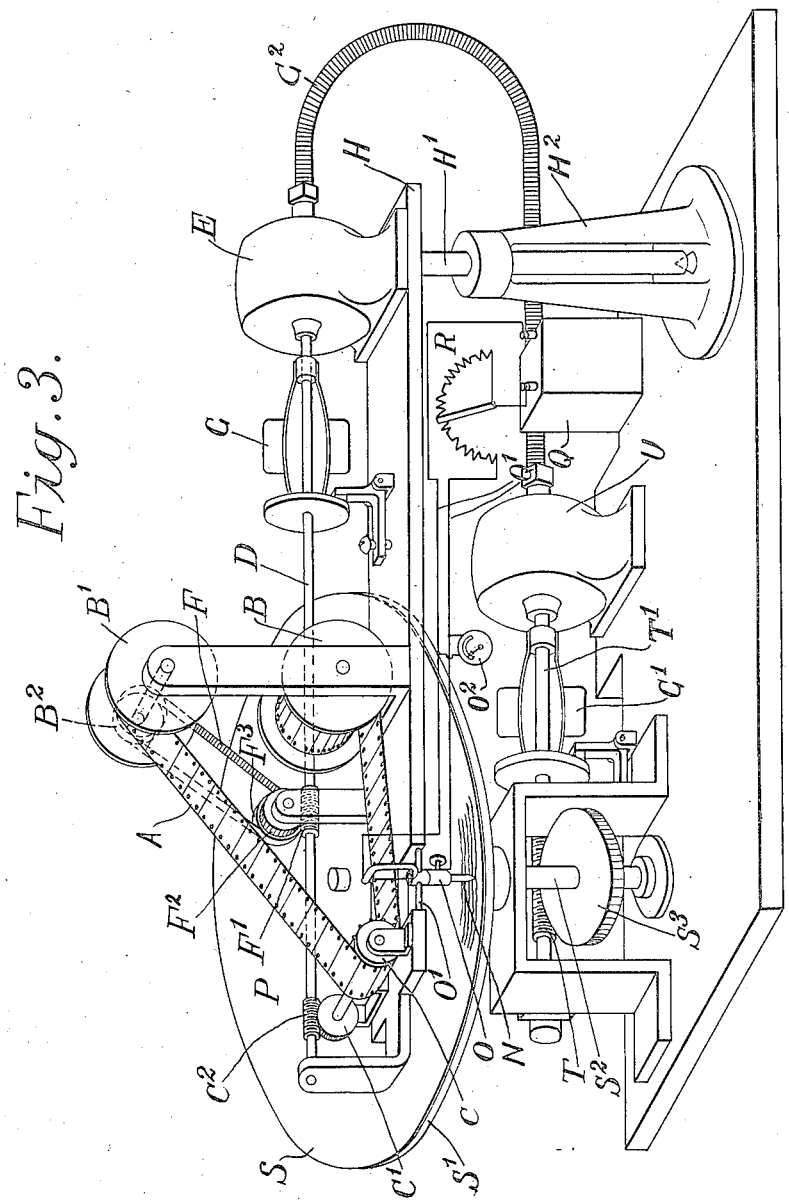

UNITED STATES PATENT OFFICE.

KATHARINA VON MADALER, OF WEST DRAYTON, ENGLAND, ASSIGNOR TO PROJECTO-PHONE COMPANY INC., A CORPORATION OF NEW YORK.

APPARATUS FOR PREPARING COMBINED CINEMATOGRAPHIC AND PHONOGRAPHIC RECORDS.

1,204,091.

Specification of Letters Patent. Patented Nov. 7, 1916.

Application filed October 14, 1911. Serial No. 654,774.

*To all whom it may concern:*

Be it known that I, KATHARINA VON MADALER, a subject of His Majesty the King of Hungary, and residing at West Drayton, England, have invented a certain new and useful Improvement in Apparatus for Preparing Combined Cinematographic and Phonographic Records, of which the following is a specification.

This invention relates to apparatus for preparing a record whereby to produce simultaneously the visible and audible elements of an event or series of events in a manner successfully to create the illusion of witnessing such actual event or events themselves. It has been proposed to do this by using the usual moving picture camera and a phonograph at the same time to form separate records of the visible and audible elements of the event or scene to be preserved or reproduced; and, in order to insure synchronism in due order of the respective records, various complicated synchronizing means have been proposed to be used in the reproducing apparatus. This mode of procedure is open to certain obvious disadvantages, and particularly to the delicacy and uncertainty of all synchronizing means. I have invented a simple apparatus for producing the double illusion above mentioned without employing synchronizing apparatus during reproduction. At the same time I secure a rigid synchronizing of the two records, which never needs adjustment and is always reliable.

My invention involves a variety of features, some of which are described and claimed in divisions of his application, namely in my applications Serial Numbers 17,676, 17,677 and 17,678, all filed March 29th, 1915. In all of these the end had in view is to reproduce the desired views and sounds from a single transparent or translucent film carrying the positive photographs in due order of successive instantaneous phases of the desired visible scene, together with the record on the same film of the corresponding audible elements thereof. The respective parts of the sound record occupy a uniform spacial relation with respect to the corresponding individual views, whereby synchronism is preserved at all times.

The film itself as finally produced, and the method or process employed to produce it are set forth and claimed in certain other divisions of this application.

Figure 1:
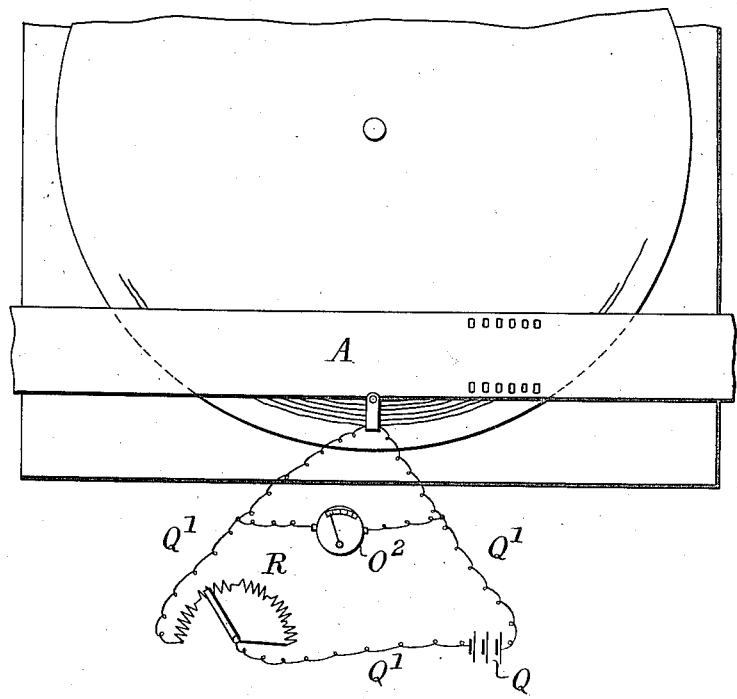
Figure 2:
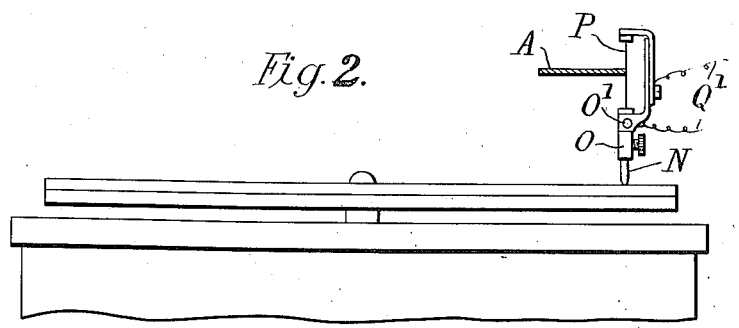

In order that the invention may be readily understood reference is made to the accompanying drawings which illustrate diagrammatically one embodiment of it, and in which:

Figure 1 is a plan of part of an apparatus for reproducing the sound curves or grooves of a disk sound record onto the edge of a film. Fig. 2 is an elevation of same partly in section and Fig. 3 is a perspective view of the apparatus as a whole.

The record S (shown as a disk record but not essentially such) is supposed to have been made in the usual manner during occurrence of the actual events or scenes to be reproduced; and the cinematograph or moving picture film A is the usual succession of positive photographs representing successive instantaneous phases of the visible elements of such events or scenes. These records having been prepared in any manner, my invention involves the production of a rigidly synchronized record capable of use for reproduction by copying on the film itself—and preferably, as shown, on the edge of the same—the sound record on the disk S; and so placing it that there shall be a substantially uniform spacial relation between each picture on the film and the corresponding part of the sound record. One method and apparatus for this purpose is operated as follows: Referring to the drawings A represents a cinematograph film which is adapted to be unwound from a spool or bobbin B onto another spool B'. The film is carried over a driving sprocket drum C the spindle of which carries a worm wheel C' that gears with a worm $C^2$ on a driving shaft D driven by a motor E. The bobbin b' is driven from the shaft D by means of a spiral spring belt F through the medium of a worm F' on the shaft D, worm wheel $F^2$, pulley $F^3$ and pulley $B^2$. A speed governor G of well known construction is mounted on the shaft D to control the speed of same. All of the aforementioned parts are carried by a swinging arm H mounted on a vertical shaft H' supported in a bearing bracket H². A needle N or sapphire is removably held in a holder O which is pivoted to the arm H at O'. The upper portion of this holder is in the form of a yoke and has a platinum wire P stretched between the two arms thereof. This platinum wire is adapted to be heated to a dull red heat by means of an electric current from a battery Q through the wires Q'. A volt meter O² and an adjustable resistance R are introduced into the circuit for the purpose of maintaining a constant current in the circuit and consequently a uniform heat in the platinum wire P.

The needle N is adapted to rest in the sound groove of a disk record S which is carried by a turntable S'. The turntable S' is mounted on a vertical spindle S² on which is a worm wheel S³ that gears with a worm T on a driving shaft T' driven by a motor U. A governor G' is provided on the shaft T' to regulate or control the speed of the latter.

The operation of the apparatus is as follows: Having placed the film in the position shown in Fig. 3 and the disk record on the turntable with the needle engaging the sound groove thereof, the motors E, U are set in motion and the current turned on in the circuit Q'. The result will be that the film is moved past the wire P with its edge in contact therewith and the wire will vibrate in accordance with the sound grooves of the disk record. The arm H will travel toward the center of the disk record in a similar manner to that of the sound arm of a gramophone. It will therefore be seen that the wire P will burn or melt the edge of the film and thereby reproduce the sound curves of the disk record onto the edge of the film.

The governors G G' control the speed of the motors E, U, which are coupled together by a flexible shaft G² so that the film A and the record S are driven at the same speed to produce a sound record on the film which will be in synchronism with the pictures on the latter.

It is the practice, when ordinary films are employed, to cut out damaged pictures and join the ends of the film again without replacing the pictures, the defect thus produced being hardly perceptible. This, however, would not be possible if films having a sound record thereon are employed because any break in the sound record would be most objectionable. If therefore it becomes necessary to remove some of the pictures, on account of their damaged condition, those parts of the film that are removed must be replaced by new portions exactly similar to the parts removed. In order to facilitate the replacing of damaged parts in the film the pictures are preferably numbered. This may be done automatically when taking the pictures or the sound record.

When a ribbon has been suitably prepared in this manner, it may be run through a suitable cinematographic display machine, while the edge is made to act upon a suitably placed phonographic reproducing apparatus. These features are shown, described and claimed in a division of the present application (Serial No. 17678) and need no further discussion here.

It is obvious that the copying may be carried out on both edges of the film if desired. By this means a film record is produced by means of which the sound can be much increased without such a straining of a single diaphragm in a single reproducer as would tend to impair the quality of the tone produced.

My invention may be embodied in a variety of apparatus or in modified methods and records, and I do not limit myself to the details herein shown and described.

What I claim is:—

1. Apparatus for copying upon a ribbon a phonographic record from a master record, comprising in combination a wire suitably mounted with relation to said master record, means for heating said wire and means for causing said ribbon to move past said wire with its edge in contact therewith.

2. Apparatus for copying upon a ribbon, a phonographic record from a master record comprising in combination means for causing appropriate longitudinal travel of said ribbon, a support therefor adapted to permit proper movement of said means to follow the line of undulations in said record, a stylus suitably mounted, a wire so connected with said stylus as to vibrate with it, and means for electrically heating said wire.

3. The combination of means for supporting a ribbon, a sound record, a stylus in contact with the sound grooves in said record, a pivotally mounted wire attached to said stylus, means for heating said wire, means for rotating said record and means for moving said ribbon past said wire with an edge in contact therewith.

4. The combination of a flat phonograph record, a support adapted to swing over and parallel with it, ribbon carrying means mounted on said support, a vibratory wire also on said support and adapted to be vibrated by said phonograph record, means for driving said phonograph record, and means for moving the ribbon past said wire and in contact therewith.

5. The combination of means for supporting a cinematograph film, a sound record, a needle in contact with the sound grooves on said record, a holder for said needle said holder being pivotally mounted, a wire supported by said holder, means for heating said wire, means for rotating said record and means for moving said film past the wire with an edge of the film in contact with said wire.

In witness whereof I have hereunto set my hand in the presence of the two subscribing witnesses.

KATHARINA von MADALER.

Witnesses:
G. CRUESEMANN,
R. WESTACOTT.